Sept. 19, 1944.   L. WARREN ET AL   2,358,485
TRANSPARENT PANEL MOUNTING
Filed April 28, 1941   2 Sheets-Sheet 1
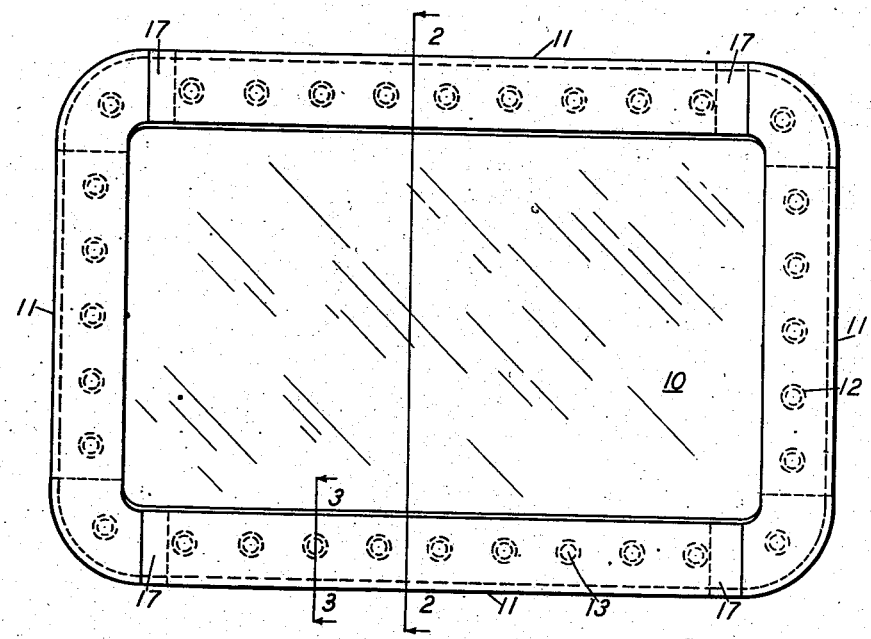
FIG-1
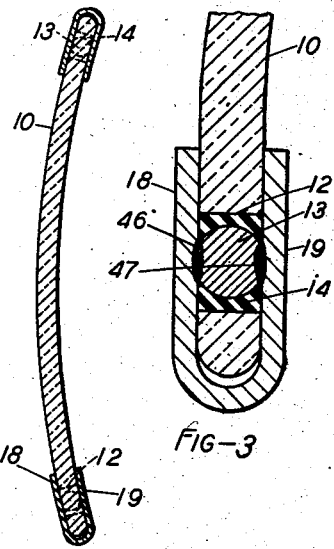
FIG-2
FIG-3
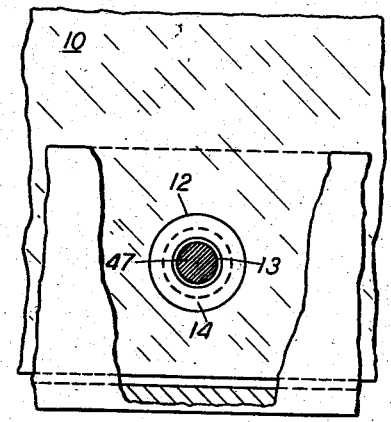
FIG-4
INVENTORS
Lee Warren
Alfred M Anderson Sept. 19, 1944. L. WARREN ET AL 2,358,485
TRANSPARENT PANEL MOUNTING
Filed April 28, 1941 2 Sheets-Sheet 2

INVENTORS
Lee Warren
Alfred M. Anderson

Patented Sept. 19, 1944

2,358,485

UNITED STATES PATENT OFFICE 2,358,485

TRANSPARENT PANEL MOUNTING

Lee Warren, Burbank, and Alfred M. Anderson, North Hollywood, Calif., assignors to Lockheed Aircraft Corporation, Burbank, Calif.

Application April 28, 1941, Serial No. 390,776

7 Claims. (Cl. 189—77)

This invention relates to an improved mounting for panels and finds its most specific application in the fabrication of transparent window and windshield panels for aircraft.

An object of this invention is to provide resilient means for retaining and framing relatively thin fragile panel materials which have coefficients of expansion widely different from the metal structures to which they are to be applied.

It is also an object of this invention to provide positive yet resilient means to mount thin fragile panels whereby they can withstand extremely wide and rapid temperature changes and also to withstand strains which are transmitted to them from within the aircraft or vehicle structure.

It is also an object of this invention to provide resilient yet positive means to mount thin panels whereby the edge tensile stresses therein occurring by reason of pressure differentials can be resisted.

A further object of this invention is to provide means for retaining and framing fragile panels composed of such materials as glass, cellulose acetate, poly vinyl acetyl, methacrylate, the poly styrenes, phenol-formaldehyde polymerization products and the like resins and plastics which have high coefficients of linear expansion relative to that of their metal mountings.

A still further object of this invention is to accomplish the before mentioned objects by means and methods which are readily adaptable to high speed production.

Other objects and features of novelty will be evident hereinafter.

In the drawings which illustrate a preferred embodiment of the invention—

Figure 1 is a face view of a typical windshield or window panel mounting;

Figure 2 is a cross-sectional view taken at line 2—2 on Figure 1;

Figure 3 is an enlarged fragmentary cross-sectional view taken at line 3—3 on Figure 1;

Figure 4 is an enlarged fragmentary face view in partial cross-section of a portion of the mounting frame;

Figure 5:
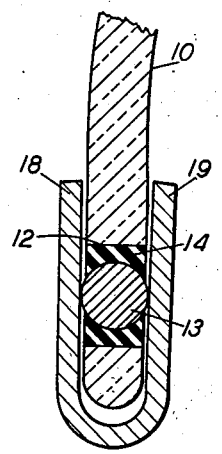
Figure 5 is an enlarged cross-sectional view of the frame similar to Figure 3 but illustrating one step of the assembly.

While the invention may have numerous uses such as in building structures, or in vehicles such as railroad cars, ships and the like, for purposes of illustration herein, the invention is shown and described in its typical and most specific application to a window or windshield frame unit which may be attached in any suitable manner to an aircraft such as an airplane. In its application to use in an airplane window or windshield, for example, the frame carrying the panel as illustrated in Figure 1 may be mounted in suitable runners or guides, not shown, whereby it can be moved for opening and closing. The panel may be flat or it may be curved as illustrated, to conform with the contour of the portion of the aircraft to which it is to be applied.

Figure 6:
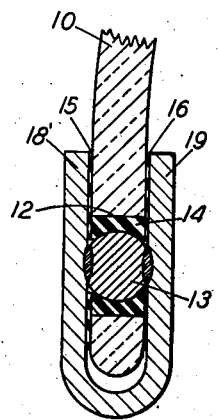
Figure 6 is an enlarged fragmentary cross-sectional view of a modified mounting arrangement similar to that of Figure 3.

Referring to the drawings and particularly Figures 1 to 5, 10 is a transparent panel of glass or suitable transparent plastic or resin such as "Plexiglass," 11 is a four piece channel-sectioned frame member adapted to enclose the marginal portion of the panel, 12 are holes or openings, a plurality of which are drilled along the marginal portion of the panel at substantially equal spaces center to center, and 13 are metal spheres having diameters slightly greater than the thickness of the panel sheet and substantially less than the diameter of the holes 12. Resilient grommets or bushings 14 composed of rubber, neoprene or other suitable elastic material are positioned in the substantially annular clearance spaces between the said metal balls and the inside surfaces of the holes 12.

Where an air and water tight fit is desired between the channel frame and panel, a pair of thin flat sealing strips or gaskets 15 and 16 composed of rubber or neoprene or rubberized fabric may be positioned on either side of the panel margin surface and under the channel frame as shown in Figure 6.

Lap joints 17 are provided at the corners as shown in Figure 1 to permit opening the frame sufficiently to allow the preformed panel 10 to be inserted into the grooves formed between the channel legs 18 and 19.

Figure 7:
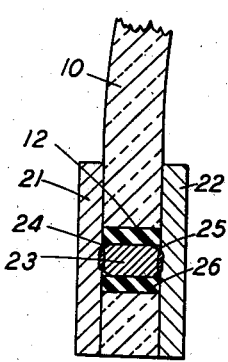
Figure 7 is an enlarged fragmentary cross-sectional view of an optional form of frame construction.

In Figure 7 an optional form of frame construction is shown in which instead of employing channel elements as shown in Figures 1 to 4, a pair of separate rectangular-sectioned frame members 21 and 22 are employed. In this construction corner joints are not necessary to enable the panel to be inserted in the frame as in the case with the channel frame structure, since the rectangular frame members can be readily applied each in a single complete unit to either side of the panel margins. While in this type of construction, metal joining spheres may be employed in the manner shown at 13 in Figures 3 to 5, an optional joining means in the form of metal cylinders 23 having tapered or rounded ends as shown at 24 and 25 may also be employed.

Resilient grommets or bushings 26 surround the metal joining cylinders 23 and fill the annular spaces between the said cylinders 23 and the inside surfaces of the panel margin holes.

Figure 8:
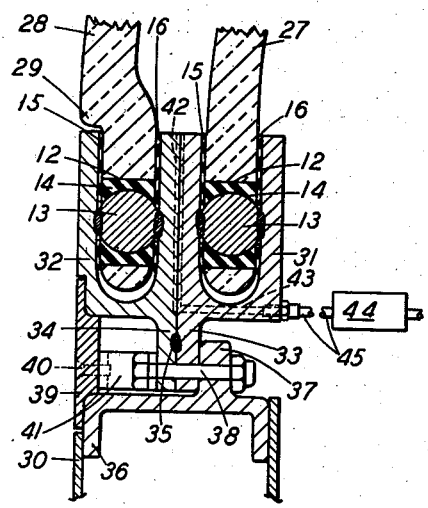
Figure 8 is an enlarged fragmentary cross-sectional view of a double panel mounting arrangement and a typical means of installation in an airplane fuselage wall.

In Figure 8 another optional form of frame construction is illustrated, this form being adapted to the mounting of double panels with an air space between. In this figure, 27 and 28 are inner and outer transparent panels respectively which may be constructed of any of the before mentioned materials. The outer panel 28 is formed with an offset section as shown at 29 to present an outer surface flush with the outer fuselage skin surface 30. The panels 27 and 28 are each mounted in channel frame sections 31 and 32 respectively in the same manner as that illustrated and described in connection with Figures 3 to 5. These channel frame sections each carry outwardly extending flange members 33 and 34 which are preferably electrically roll welded together around the periphery as shown at 35. Although they may be bolted together if desired without welding where it is desired to have them readily separable for cleaning, repairing or the like.

A window frame channel 37 associated with the aircraft carrying an intermediate inwardly extending flange 37 is adapted to support the window channel assembly by means of a plurality of bolts which pass through the flanges as shown at 38. A cover strip 39 serves to provide a continuous flush surface between the outer surface of the panel frame channel member 32 and the outer skin 29, said cover strip being attached by means of a plurality of countersunk screws 40 which make threaded connections with a plurality of Z shaped clips 41. The lower legs of the clips 41 pass under certain of the heads of bolts 38.

A drilled passage 42—43 may be provided through the channel frame to vent the enclosed air space formed between the two panels 27 and 28 to the atmosphere or to the inside of the airplane fuselage as illustrated in Figure 6 whichever may be desired for the purpose of pressure equalization. A chamber 44 adapted to contain a suitable dehydrating agent may be provided with suitable pipe connections 45 to the said vent through which the air necessary for pressure equalization may flow. Provision is thus made for maintaining a substantially water free atmosphere between the transparent panels for the purpose of preventing fogging or frosting which may otherwise occur under low temperature conditions.

In the case of pressurized airplane cabins such as employed for stratosphere or substratosphere flying, this vent may be made either to the inside pressurized region or to the outside atmosphere, depending upon which of the two panels it is desired to have resist the pressure differential. In case the pressure differential is to be borne by the inside panel, the vent is made to atmosphere and when the pressure is desired to be borne by the outside panel the vent is made to the cabin interior as illustrated.

The fabrication processes are as follows: The transparent panel 10, preformed if necessary to the desired surface contour is, after being cut to size, drilled along its margin to form a plurality of substantially equi-spaced holes 12. These holes in the case of a $\frac{1}{8}$ inch panel mounting, for example, may be approximately 1½ to 2½ inches center to center. Marginal holes for this thickness of panel may be in the order of $\frac{1}{8}$ inch in diameter. After drilling, the resilient grommets or bushings 14, which may be composed of rubber, neoprene or the like material, are placed in the drilled holes, and in each grommet a metal sphere 13 which may be of any suitable composition such as stainless steel, aluminum, magnesium or the like, is inserted. The metal balls or spheres should have diameters slightly greater than the thickness of the panel sheet in order that the opposite faces of said sphere may project a sufficient distance from each end of the panel holes to make contact with the opposite inside surfaces of the channel frame legs. For $\frac{1}{8}$ inch panel thicknesses, spheres of $\frac{5}{32}$ inch have been found satisfactory, and this allows a grommet wall thickness of $\frac{3}{64}$ inch in a $\frac{1}{8}$ inch diameter panel margin hole.

The assembly of panel sheet, grommets and metal spheres having been thus accomplished, this panel assembly is next forced into position within the channel frame sections, the channel frame closed around its edge and the corner joints 17 secured by any suitable means such as by spotwelding the overlapping surfaces together. The channel in this initial stage of the assembly appears in cross-section substantially as illustrated in Figure 5, the legs having been forced apart and out of parallelism by the metal spheres which have diameters slightly greater than the normal spacing between the inside surfaces of the said channel legs. Pressure is then applied to the outside opposite surfaces of the channel legs at points 42 and 43 by means of an electric spotwelding machine and the electrical current applied simultaneously with the pressure. The resulting fusion of the metals at the points of contact as shown at 46 and 47 between the metal spheres 13 and the respective inside surfaces of the channel legs allow the channel to be closed securely upon the panel margin as shown in Figure 3. This welding procedure is repeated opposite each metal ball around the entire length of the periphery of the panel frame. A suitably tight contact is thus formed between the channel frame and the panel margin to confine firmly the panel within the frame while at the same time slight movement of the panel with respect to the channel frame may take place within the limits allowed by the resilient grommets, to compensate for differences of expansion and contraction during temperature changes or strains within the structure to which it is applied. The panel is thus positively retained in and joined to the channel frame while at the same time a limited degree of resilience is provided between the panel and frame. The panel holes and the resilient grommets may be any desired size to allow the required amount of movement between frame and panel sheet, taking into consideration the difference in their coefficients of expansion, the size of the frame and the maximum temperature differences to be encountered.

Where a substantially air and water tight seal between channel frame and panel is required a pair of suitably formed gaskets 15 and 16 may be placed between the channel frame legs 18 and 19 and the marginal portion of the panel to be enclosed therein. Upon spotwelding the channel frame in place in a manner similar to that described in connection with Figures 3 and 5, the gaskets 15 and 16 are compressed against the panel margin surfaces forming a resilient but fluid tight seal. As before stated, the said gaskets may be composed of thin rubber or neoprene sheet or rubberized fabric.

In some cases it may be desirable to employ rectangular sectioned panel frame members such as illustrated at 21 and 22 in Figure 7 instead of channel sections as shown in Figure 3. In such cases the frame member need not be constructed in divided sections to be subsequently joined at the corner as shown at 17 in Figure 1 as is necessary when employing channel shaped frame member sections but instead the frame member may be constructed in single units of the desired form and contour. Assembly of the rectangular sectioned frame units upon the panel margins is preformed in a manner similar to that described hereinbefore in connection with Figures 3 to 5, the interconnecting metal pins 23 carried by the grommets 26 in the panel margin being spotwelded at 45 and 46 to the inner surfaces of the frame members. Metal spheres may be employed and in some cases are preferably employed to join the opposite frame members together.

In the assembly of the double panel type of mounting as illustrated in Figure 8, the two panels 27 and 28 are each separately spotwelded in place in the special channel sectioned frame members in the manner described in connection with Figures 1 to 5. Following this the two panel frames are joined face to face to form a double panel by electric welding, preferably by means of a substantially continuous roll weld through the flanges 33 and 34 at 35. The double panel unit thus assembled may then be fastened in place by means of a plurality of bolts adapted to pass through a plurality of spaced holes drilled through the thus joined flanges 33 and 34. In the case of an airplane fuselage the double panel may be bolted to an inwardly extending flange portion 37 of a window frame opening channel 36.

In airplanes adapted to high altitude flying it is desirable to pressurize the cabin to maintain an internal pressure equivalent to some given lower altitude at which the passengers and crew will not be discomforted. Under pressurized conditions it is necessary that the window panels be capable of withstanding a differential pressure in the order of 4 to 6 pounds per square inch. The various synthetic transparent plastics and resins such as, for example, the methacrylate resin known by the trade name of "Plexiglass" are particularly well adapted to withstanding the bending and tensile stresses set up by these differential pressures. However, "Plexiglass" and also the several other suitable resins and plastics are relatively soft and easily scratched and, therefore, are not so well suited to resisting the abrasion attendant upon being exposed to the impingement of the dust and dirt particles carried by the high speed air stream on the exterior of aircraft.

The before described double window construction is particularly well adapted to these conditions. Under such conditions it has been found desirable to construct the outer panel, for example, panel 28 of Figure 8 of glass or other suitable hard material that is highly resistant to abrasion but which may not be so well suited to resisting the stresses which might be imposed upon it by differential pressures, and to construct the inner panel, for example panel 27 of "Plexiglass" which is well adapted to resisting these stresses. When this arrangement is made the vent 42—43 is connected to the outside atmosphere so that atmospheric pressure is maintined at all times within the space intermediate the two panels. The outer glass panel thus serves to protect the inner Plexiglass from the air stream and to fair the window opening flush at all points with the airplane skin surface, but it is not placed under any differential air pressures. The inside Plexiglass panel which is protected by the glass panel forms the air tight seal and normally takes all of the differential air pressure.

In large panel openings such as employed in windshields or in pilot compartment canopies where the transparent panel may extend over the fuselage for a substantial proportion of the fuselage diameter and thus may have deep curvatures, the panels may be subjected to considerable tensile stresses by reason of the differential air pressures associated with cabin pressurization. The positive panel attachment of this invention is particularly well adapted to resisting such tensile stresses. Panels which are attached to the panel frames in the manner of this invention, hereinbefore described, are also more resistant to the differential pressures set up between the inner and outer surfaces thereof by reason of the high velocity air flow over the outer surfaces thereof when the aircraft is in flight.

Materials suitable for construction of the framework and metal spheres are aluminum, aluminum alloys, and steel, preferably stainless steel.

The resilient bushing or grommets employed may be of rubber or neoprene or the like suitable natural or synthetic rubber-like materials.

As stated hereinbefore, the panel may comprise any desired material such as glass, cellulose acetate, poly vinyl acetyl, methacrylate, poly styrenes, and phenol-formaldehyde and the like resins, plastics and polymerization products.

This invention finds one of its chief advantages in the mounting of transparent panel materials such as the acrylic resin known by the trade name of "Plexiglass" in aircraft structures which are largely constructed of metal such as aluminum, aluminum alloys and stainless steel. The coefficient of linear expansion of Plexiglass, for example is approximately $8 \times 10^{-5}$ inches per inch per degree centigrade while the coefficient of linear expansion of aluminum alloy is approximately $2.7 \times 10^{-5}$ and steel $1.3 \times 10^{-5}$ inches per inch per degree centigrade. Thus it is apparent that the ratio of the coefficients of expansion of Plexiglass to aluminum alloy is in the order of 3 to 1, and this is in general true for substantially all of the desirable combinations of transparent plastics or resins and aluminum alloy structure. The ratio of the coefficients of expansion of Plexiglass to stainless steel is approximately 6 to 1.

It is obvious, therefore, that in the large range of temperatures encountered in high altitude flying by modern aircraft, considerable movement by slippage between the stainless steel or aluminum alloy framing structure and panel is necessary in order to provide for these large expansion differences. The resilient panel mounting structure in accordance with the present invention is particularly adapted to provide for these varying temperature conditions.

The description herein is not to be limiting but is merely illustrative of a preferred embodiment of the invention and other variations of the invention are possible within the scope of the claims.

We claim:

1. A method for framing fragile panel sheeting in metal comprising forming a plurality of spaced holes along the marginal portion of said panel adjacent the edge thereof, placing resilient bushings in said holes, inserting metal inserts through said bushings in said holes, said metal inserts extending through said bushings and projecting slightly beyond the thickness of said panel sheeting and spotwelding the projecting faces of said metal inserts to a metal frame.

2. A method for framing fragile panel sheeting in metal comprising forming a plurality of spaced holes along the marginal portion of said panel and adjacent the edge thereof, placing resilient bushings in said holes, inserting metal spheres into said bushings in said holes, said metal spheres having diameters slightly greater than the thickness of said panel sheeting and spotwelding the opposite exposed faces of said metal spheres to a metal frame.

3. A method for framing fragile panel sheeting in metal comprising forming a plurality of spaced holes along the marginal portion of said panel and adjacent the edge thereof, placing resilient bushings in said holes, inserting metal spheres into said bushings in said holes, said metal spheres having diameters substantially less than the diameters of said holes but slightly greater than the thickness of said panel sheeting, inserting the said marginal portion of said panel carrying said metal spheres into the opening and between the opposite legs of a substantially channel shaped metal strip, compressing the said channel legs on to the surface of said panel and into contact with opposite exposed faces of said metal spheres and spotwelding said spheres at the opposite points of contact thus formed with the inside surfaces of said channel legs.

4. A transparent window or the like panel mounting comprising in combination a panel sheet, a unitary channel-sectioned metal frame surrounding at least a portion of the margin of said panel, a plurality of spaced openings formed in the marginal portion of said panel, a plurality of metal inserts attached at opposite ends to opposite legs of said channel-sectioned metal frame and extending through said openings and resilient means positioned in said openings between said metal inserts and said panel whereby said panel and said frame are joined together but have limited relative freedom of movement upon changes of temperature.

5. A transparent window or the like panel mounting comprising in combination a transparent panel sheet, a metal frame surrounding at least a portion of the margin of said panel, a plurality of spaced openings formed in the marginal portion of said panel, a plurality of metal, spherical inserts attached to said metal frame and extending through said openings, and resilient means positioned in said openings between said spherical inserts and said panel whereby said panel and said frame are joined together but have limited relative freedom of movement upon change of temperature.

6. A transparent window or the like panel mounting comprising in combination a transparent panel sheet, a channel-sectional metal frame surrounding and enclosing between the opposite legs thereof at least a portion of the margin of said panel, a plurality of spaced openings formed in the said enclosed marginal portion of said panel, a plurality of metal spherical inserts extending through said openings and spotwelded at opposite faces to the inside surfaces of the opposite enclosing legs of said channel frame, and resilient bushings positioned in said openings between said spherical inserts and said panel whereby said panel and said frame are positively joined together but have limited relative freedom of movement upon change of temperature.

7. A transparent window or the like panel mounting comprising in combination a transparent sheet of Plexiglass, a stainless steel channel sectioned frame surrounding and enclosing between the opposite legs thereof at least a portion of the margin of said Plexiglass sheet, a plurality of spaced holes formed in the said enclosed marginal portion of said sheet, a plurality of stainless steel spherical inserts extending through said marginal holes and spotwelded at opposite faces to the inside surfaces of the opposite enclosing legs of said channel frame, and resilient bushings positioned in said holes between said spherical inserts and said sheet whereby said sheet and said frame are positively joined together but have limited relative freedom of movement upon change of temperature.

LEE WARREN.
ALFRED M. ANDERSON.